United States Patent
Kao et al.

(10) Patent No.: US 7,297,223 B2
(45) Date of Patent: Nov. 20, 2007

(54) PROCESS AND STRUCTURE OF LIQUID CRYSTAL PANEL WITH ONE DROP FILL

(75) Inventors: Tsung-Yu Yu Kao, Tao-Yuan (TW); Po-Hsiu Shih, Taipei Hsien (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 432 days.

(21) Appl. No.: 10/777,752

(22) Filed: Feb. 13, 2004

(65) Prior Publication Data

US 2004/0174491 A1    Sep. 9, 2004

(30) Foreign Application Priority Data

Feb. 14, 2003    (TW) .............. 92103039 A

(51) Int. Cl.
*B32B 37/00*    (2006.01)
*G02F 1/1339*    (2006.01)

(52) U.S. Cl. .............. 156/275.3; 156/145; 156/275.1; 156/275.5; 349/187; 349/190

(58) Field of Classification Search ............... 349/187, 349/190
See application file for complete search history.

(56) References Cited

U.S. PATENT DOCUMENTS

| | | | | |
|---|---|---|---|---|
| 6,078,378 A | * | 6/2000 | Lu et al. | 349/155 |
| 6,275,273 B1 | * | 8/2001 | Inoue | 349/40 |
| 6,628,365 B1 | * | 9/2003 | Park et al. | 349/153 |
| 6,859,250 B2 | * | 2/2005 | Lee et al. | 349/187 |
| 2002/0063842 A1 | * | 5/2002 | Gyoda | 349/187 |
| 2003/0137630 A1 | * | 7/2003 | Niiya | 349/153 |

* cited by examiner

*Primary Examiner*—Jeff H. Aftergut
(74) *Attorney, Agent, or Firm*—Birch, Stewart, Kolasch & Birch, LLP

(57) ABSTRACT

This present invention relates to a process of liquid crystal panel with one drop fill (ODF). A black matrix, which can not be penetrated by an ultraviolet light while curing a sealant, is formed on the other substrate. Hence, in this present invention, it can avoid the aforementioned problem during the curing process and simplifies the curing process.

8 Claims, 7 Drawing Sheets

PROCESS AND STRUCTURE OF LIQUID CRYSTAL PANEL WITH ONE DROP FILL

This Non-provisional application claims priority under 35 U.S.C. § 119(a) on Patent Application No. 092103039 filed in TAIWAN on Feb. 14, 2003, the entire contents of which are hereby incorporated by reference.

1. Field of the Invention

The present invention relates to a method and a structure for a liquid crystal panel by using one drop fill (ODF). More particularly, the present invention relates to a method for forming the liquid crystal panel to deposit the black matrix above the thin film transistor (TFT) or not to deposit the black matrix between the sealant and glass substrate, whereby avoid the sheltering effect of black matrix when executing curing processing of a sealant.

2. Description of the Prior Art

Materials of liquid crystal has the characteristic of flowing, hence, molecules of liquid crystal move and lead into different arrangement statuses with just a tiny force. To give an example of a most widespread familiar nematic type liquid crystal, the molecules of liquid crystal change the orientation by the effect of electric filed. Since the optic axis of liquid crystal and its molecular axis are identical, the orientation of polarizing will change according to the arrangement orientation of liquid crystal molecules when the polarized light that is irradiated from backlight module by way of polarizing film passes through liquid crystal. Furthermore, by using another polarizing film the transmittancy will varies depending on the polarization direction of polarized light. By using a distinct electric field on a distinct region of the liquid crystal to cause the distinct arrangement orientation, a liquid crystal display mainly depending on the two polarizing films and the liquid crystal within them displays distinct brightness representation of the distinct regions of the liquid crystal according to the pattern to be displayed. By using trichromatic color filters (red, blue and green (R, G, and B)) to present different colors, colorful images can be displayed on the liquid crystal displays. Because of the flowing characteristic of the liquid crystal, it is necessary to adhere to two substrates held spaced apart to form an empty cavity by using a sealant disposed in a peripheral region of them, wherein the cavity is then infused with the liquid crystal. Transistors and electrodes are deposited on the glass substrate to provide the electric field for changing the orientation of the liquid crystal. The aforementioned two polarizing films are also deposited on these two glass substrates.

Most of the prior arts for injecting the liquid crystal are applied to use a vacuum insertion process and it is as follows. The two glass substrates (Liquid Crystal Display Panel; LCD Panel), being composed to form an empty cavity, are put into a vacuum chamber. The cavity of the composed glass substrates is reserved an downward opening and fastened by way of a base, wherein a shallow container with the liquid crystal is set below the opening for providing liquid crystal. Since there is vacuumed in the vacuum chamber, by way of and butting the shallow container by using a spring action means and then let in the air, the cavity between the two substrates is fully filled with liquid crystal by capillary action. Finally, seal the opening, whereby the infusing of the liquid crystal is complete.

It is required a considerable longtime to complete the process for injecting the cavity with the liquid crystal. For example, if the cell gap of a 15-inch liquid crystal display panel is 3.5 um, it costs 40 hours to complete the vacuum insertion process with the liquid crystal. Moreover, the time being required to complete the process of injecting the cavity with the liquid crystal increases when the size of the liquid crystal display panel increases or the cell gap between the glass substrates decreases. Hence the process time can not be reduced, even the cost increases with the increasing of the panel size.

In order to reduce the process time, a faster process for injecting the liquid crystal has been proposed, which is called one-drop fill (ODF) technique. Before proceeding the technique, a high-adhesive sealant must be smeared over the glass substrates for being the adhesive to adhere to the glass substrates and confining the liquid crystal. The technique applies a dropping apparatus to control the dropping amount. Firstly, drop an amount of liquid crystal directly on one glass substrate and then proceed the assembling with another substrates in vacuum. After assembling, execute a sealant compressing procedure and a sealant curing procedure irradiated by ultraviolet (UV) rays, the cell process is complete. When the cell gap of a 15-inch liquid crystal display is 3.5 um, the time being required for the process of one-drop fill technique is reduced to be about 1.5 hours and not dependant on the size of liquid crystal display and the cell gap. Thus one-drop fill technique has the advantages of simplifying the process and reduces time of the process.

Although one-drop fill technique has the aforementioned advantages, it also suffers some problems. Because a high-adhesive sealant, being the adhesive to adhere to the glass substrates and confining the liquid crystal, must be formed on a substrate before liquid crystal is dropped onto the substrate. And then the sealant must be irradiated by ultraviolet rays to archive completely curing after assembling, wherein the black matrix on the glass substrates will shelter from ultraviolet rays to cause the problems of process complexity increasing and incompletely curing in the process for curing. Besides, the liquid crystal contacts with the uncured sealant while it is dropped onto a substrate, the monomers or polymers of epoxy resin in the sealant will diffuse into the liquid crystal to cause the liquid crystal contaminated and driven abnormally, whereby the damage is produced.

In order to resolve the problem of incompletely curing in the prior art, the methods of incident irradiating and substrate reflecting are applied with increased curing process complexity or the danger irradiated by ultraviolet rays. Referring to FIG. 1, form a black matrix 14 and color filters, i.e. red color filter, green color filter and blue color filter, on the first glass substrate 10. Using a sealant 16 to assemble the first glass substrate 10 and the second glass substrate 12. However, the ultraviolet rays can not penetrate the black matrix 14 and an opaque thin film transistor 13 formed on the second substrate 12 to irradiate the sealant 16. Thus, the sealant 16 cannot accept enough ultraviolet light to be cured. Furthermore, the ultraviolet rays must cure the sealant 16 through the said of the substrates 10 and 12 to prevent liquid crystal 18 from dissolved.

Therefor, the prior arts still can not effectively handling and resolving the problems resulting from curing by ultraviolet rays in the process of one-drop fill.

SUMMARY OF THE INVENTION

In the prior art, the shielding of the black matrix causes the uncured sealant that is irradiated incompletely or the liquid crystal that is explored under the ultraviolet rays. The methods of incident irradiating is used for resolving the problem of incompletely irradiation. In consideration of the prior art, it is one object of the present invention to form the black matrix upon the TFT (thin film transistor) of the bottom glass substrate, whereby it ensures that the sealant is cured completely when the light irradiates from the top glass substrates.

It is another object of the present invention to form the black matrix upon the TFT of the bottom glass substrates to avoid the light being shielded by the black matrix when the light irradiates the sealant from the top glass substrate. Thus, the light can irradiate the sealant perpendicular to the top glass substrate and the bottom glass substrate to reduce the irradiating and to ensure the quality of the liquid crystal.

It is further object of the present invention not to form the black matrix on the area where the sealant is deposited on the top glass substrate to avoid the light being shielded by the black matrix when the light irradiates the sealant from the top glass substrate. Thus the curing process is easier and the restriction of the one-drop fill (ODF) process is looser.

The present invention provides a method for manufacturing a liquid crystal panel. The method provides a first glass substrate for forming a thin film transistor thereon. A black matrix is formed on a first surface of the first glass substrate, wherein the black matrix includes a plurality of openings. A sealant is formed on the peripheral region of a first surface of a second glass substrate. An amount of liquid crystal is dropped in a space surrounded by the sealant disposed on the first surface of said second glass substrate. The first glass substrate and the second glass substrate is assembled by the sealant. The first surface of the first glass substrate faces the first surface of the second glass substrate. The sealant is then cured by irradiating a light from a side of the second glass substrate.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS present invention will become more fully understood from the following detailed description and the accompanying drawings, which are given by way of illustration only, and thus are not limitative of the present invention.

DESCRIPTION OF THE PREFERRED EMBODIMENT

Figure 1:
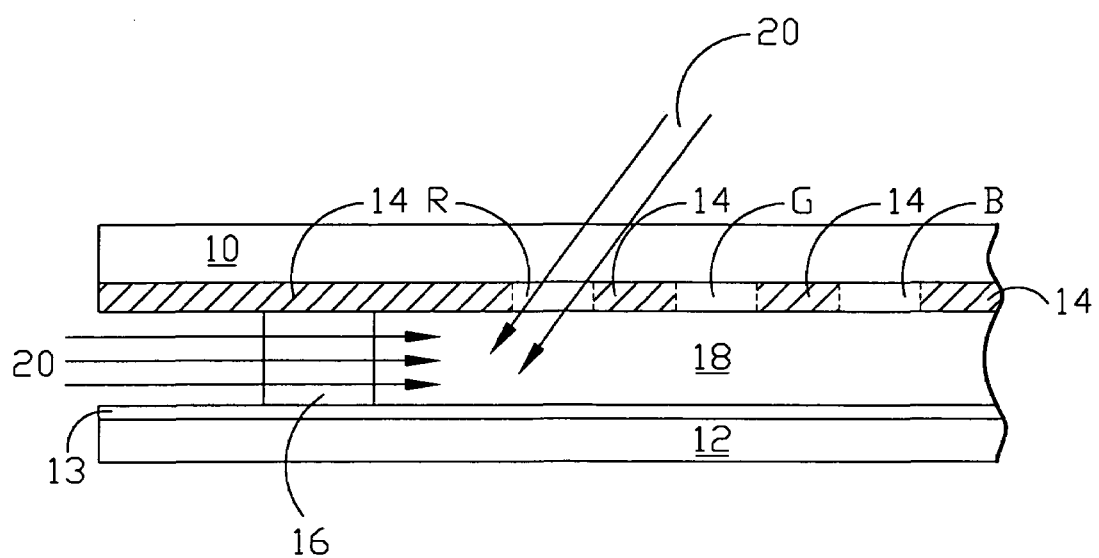
FIG. 1 is a diagram for incident irradiating to cure the sealant in the prior art.
Figure 2A:
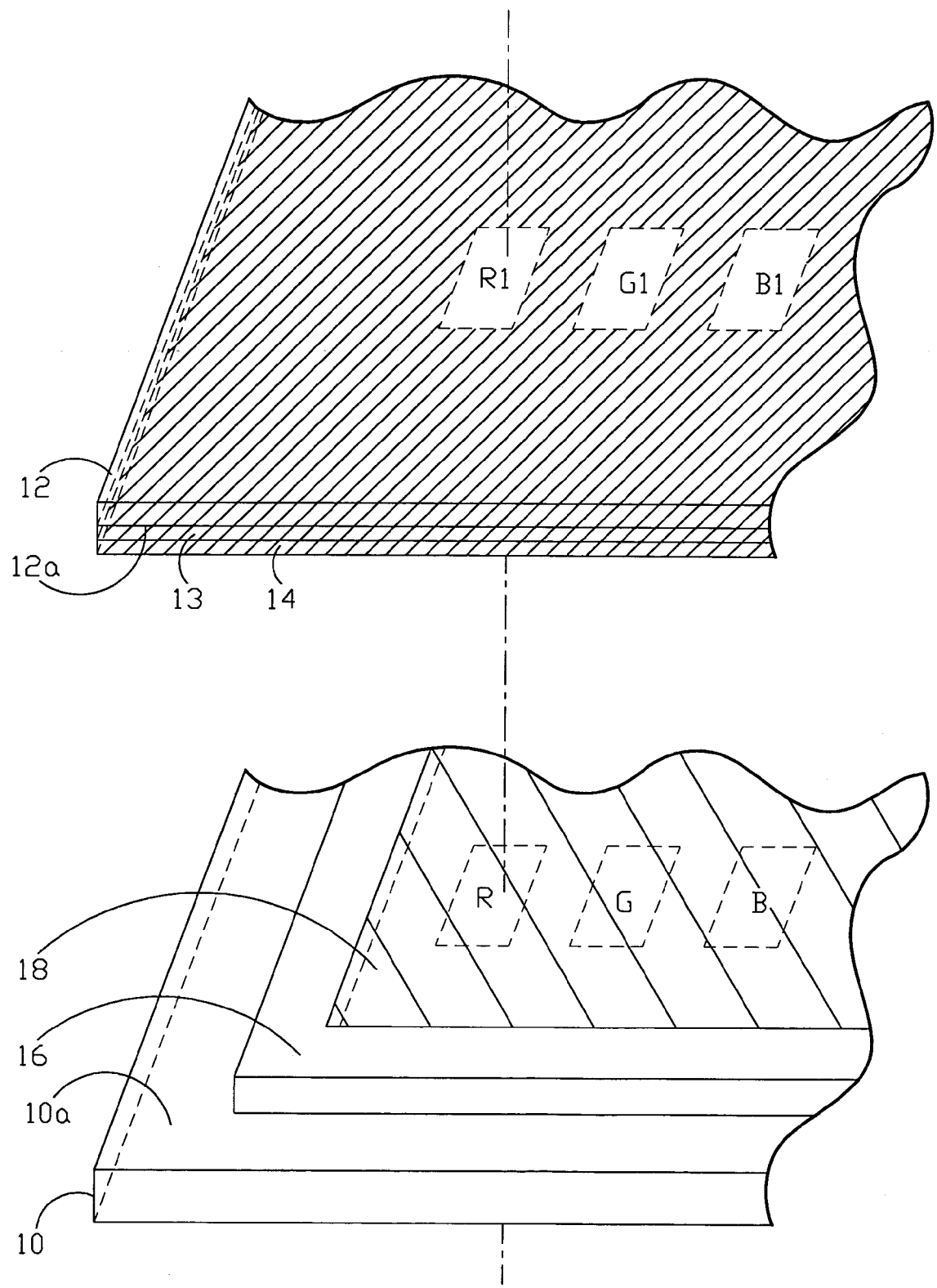
FIG. 2A and FIG. 2B are diagrams of one preferred embodiment of the present invention.
Figure 2B:
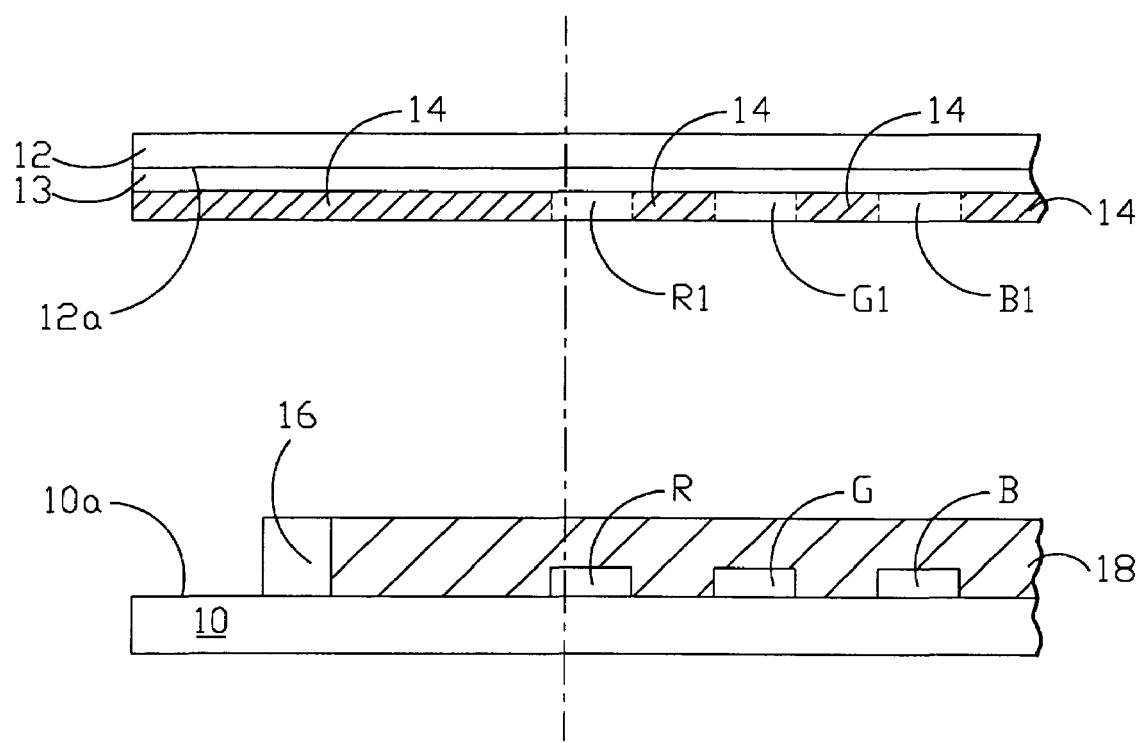

The first embodiment of the present invention is shown as FIG. 2A and FIG. 2B is a lateral view of FIG. 2A. The drawings of the embodiment (the other drawing of the following embodiment is also included) are inverted over to make them easily understood, wherein insulating layer, indium tin oxide(ITO), PI film, spacer and polarizing film are not shown. There are the color filters (Red, Green and Blue (R, G and B)) and a sealant 16 in the first surface 10a of the top glass substrate 10, where the preferred materials of the sealant 16 are acrylic resin or the synthetic material of acrylic resin and epoxy resin. There are a thin film transistor 13 and black matrix 14 on the first surface 12a of the bottom glass substrate 12, wherein the black matrix 14 is a material that can be used to shield the light and the preferred one can be chosen from the group consisting of chromium (Cr), chromium oxide (CrO) or any of the three elements of the opaque resin. The black matrix 14 is used to avoid the phenomenon of light leak during using the liquid crystal panel to enhance the quality of the contrast and the displaying. If the black matrix 14 is an opaque material with electric conductivity, a dielectric can be deposited under it to prevent the conductive phenomenon caused by contacting the other wiring. There is no black matrix 14 on some portions $R_1$, $G_1$ and $B_1$, i.e. openings, of the first surface 12a of the bottom substrate 12. The portions are mapped vertically to the areas of the color pixels on the first surface 10a of the top glass substrate 10. The color filters are formed on the first surface 10a off the top substrate 10, wherein the color filters face the openings of the black matrix 14 respectively. The color is shown by a light from the backlight module (not shown) irradiating the color filters R, G and B through the areas $R_1$, $G_1$ and $B_1$.

The proceed the one drop fill (ODF) process. Put the first surface 10a of the top glass substrate 10 upward and drop a suitable amount of liquid crystal 18, being evaluated according the size of the panel and the thickness, on a peripheral region of the first surface 10a surrounded of the sealant 16. Assemble the first surface 12a of the bottom glass substrate 12 with the first surface 10a of the top glass substrate 10 face to face. Then, a light is used to irradiate the sealant 16 through the upward surface of the top glass substrate 10 to cure the sealant 16. The light can be the ultraviolet or the visible light to cure the sealant depending on the sensitizer in the sealant 16. Comparing to the incident irradiating or substrate reflecting, irradiating the sealant 16 vertically can reduce the process complexity, thus the constraint for curing is looser.

Figure 3A:
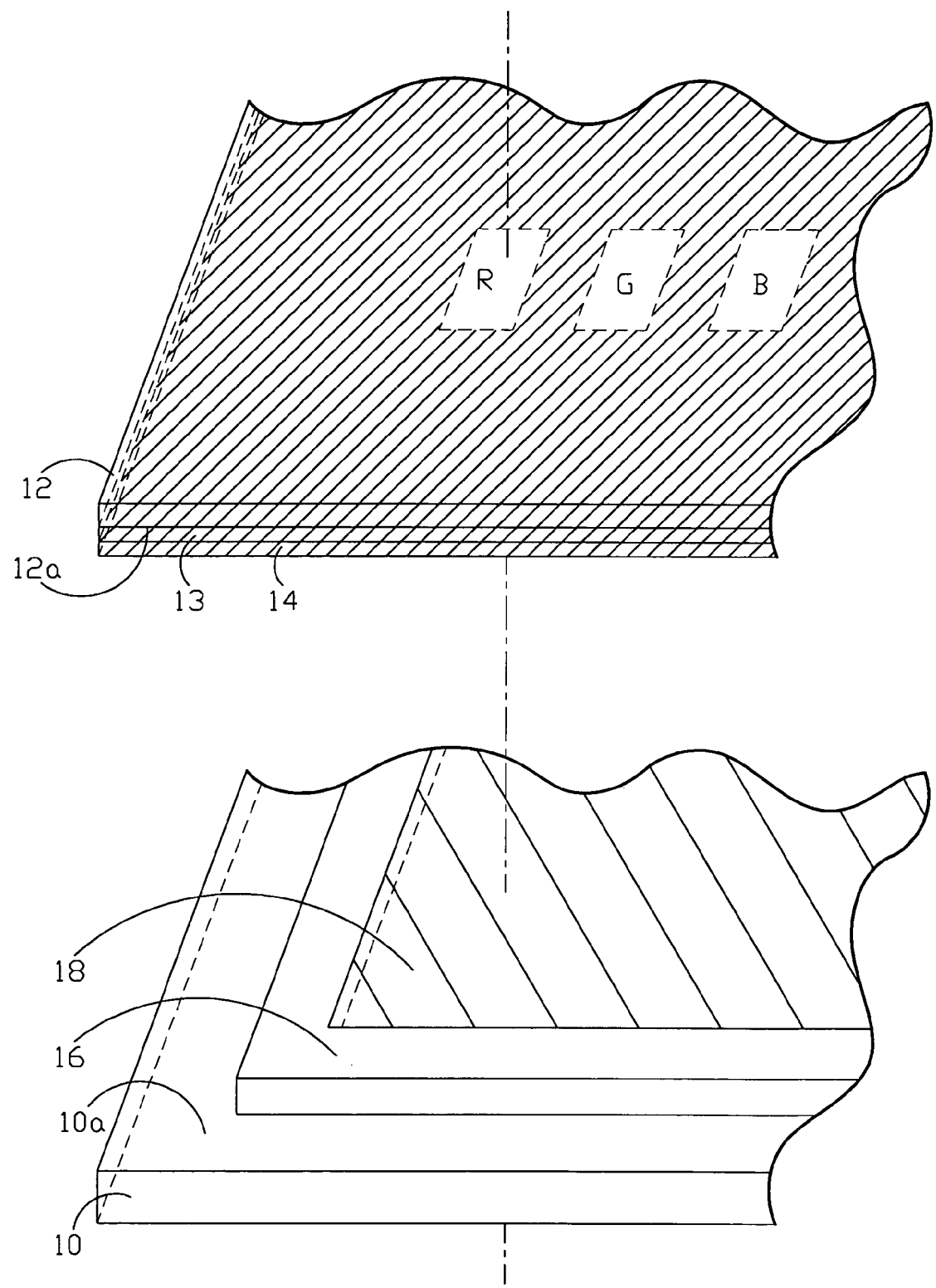
FIG. 3A and FIG. 3B are diagrams of another preferred embodiment of the present invention.
Figure 3B:
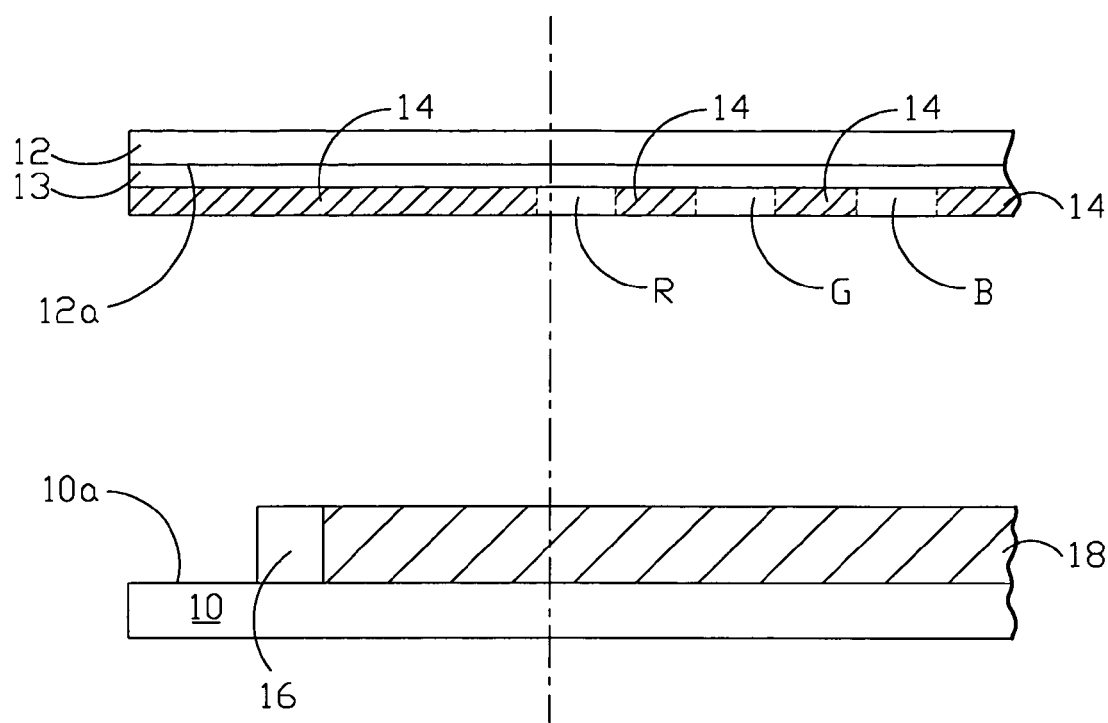

Another embodiment of the present invention is shown in FIG. 3A and FIG. 3B is a lateral view of FIG. 3A, wherein the insulating layer indium tin oxide (ITO), PI film, spacer and polarizing film are not shown. There is a sealant 16 on the first surface 10a of the top glass substrate 10, wherein the material of the sealant is acrylic resin and synthetic material. There are a thin film transistor 13 and a black matrix 14 on the first surface 12a of the bottom glass substrate 12, wherein the black matrix 14 is a material that can be used to shield the light and the preferred one can be chosen from the group consisting of chromium (Cr), chromium oxide (CrO) or any of the three elements of the opaque resin. The black matrix 14 is used to avoid the phenomenon of light leak during using the liquid crystal panel to enhance the quality of the contrast and the displaying. The color filters are formed on the first surface 12a of the bottom substrate 12, wherein the color filters in the openings of the black matrix 14 respectively. If the black matrix 14 is an opaque material with electric conductivity, a dielectric can be deposited under it to prevent the conductive phenomenon caused by contacting the other wiring.

Put the first surface 10a of the top glass substrate 10 upward and drop a suitable amount of liquid crystal 18, being evaluated according the size of the panel and the thickness, on a peripheral region of the first surface 10a surrounded of the sealant 16. Assemble the first surface 12a of the bottom glass substrate 12 with the first surface 10a of the top glass substrate 10 face to face. Then, a light is used to irradiate the sealant 16 through the upward surface of the top glass substrate 10 to cure the sealant 16.

Figure 4A:
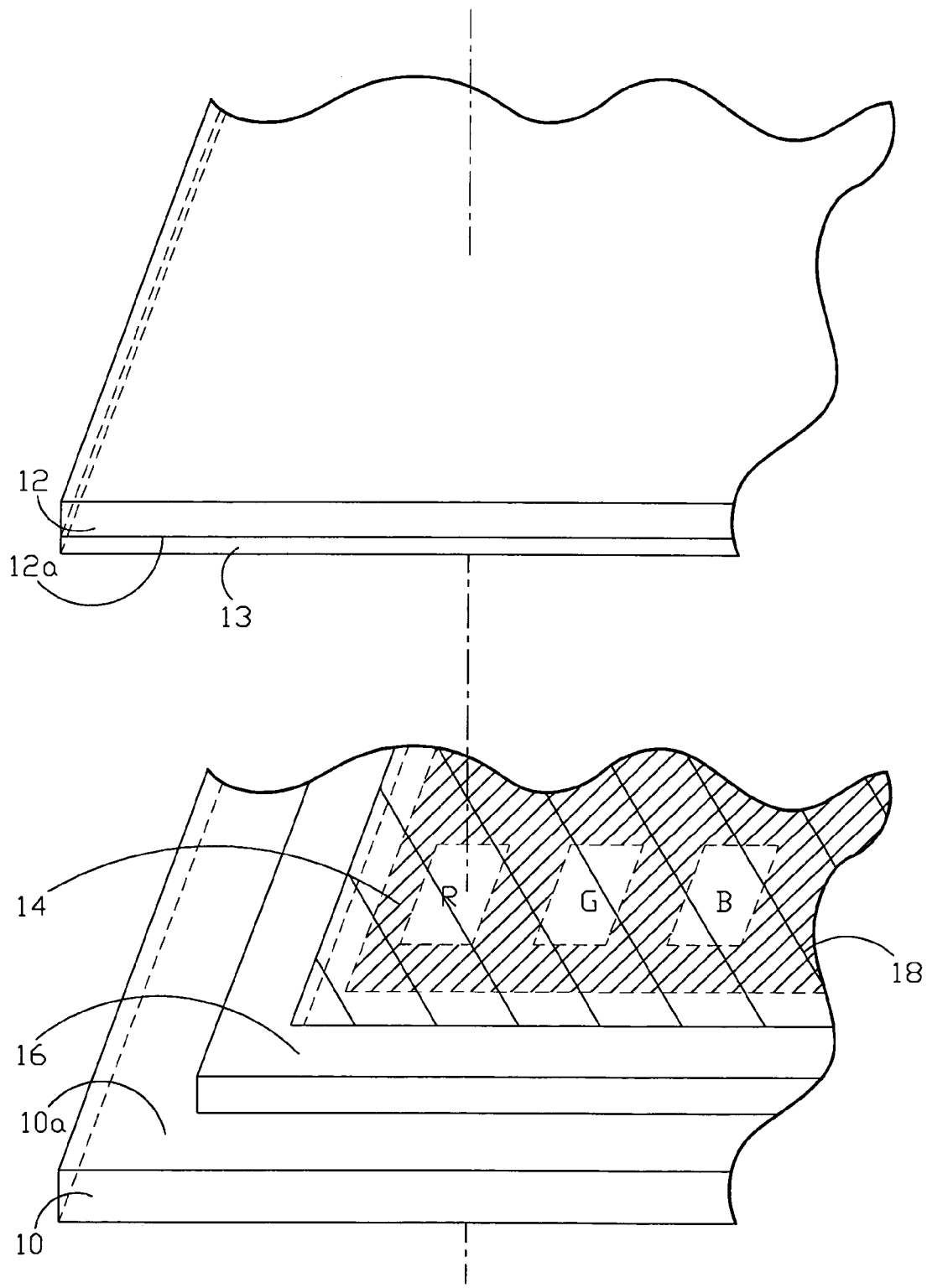
FIG. 4A and FIG. 4B are diagrams of one preferred embodiment of the present invention.
Figure 4B:
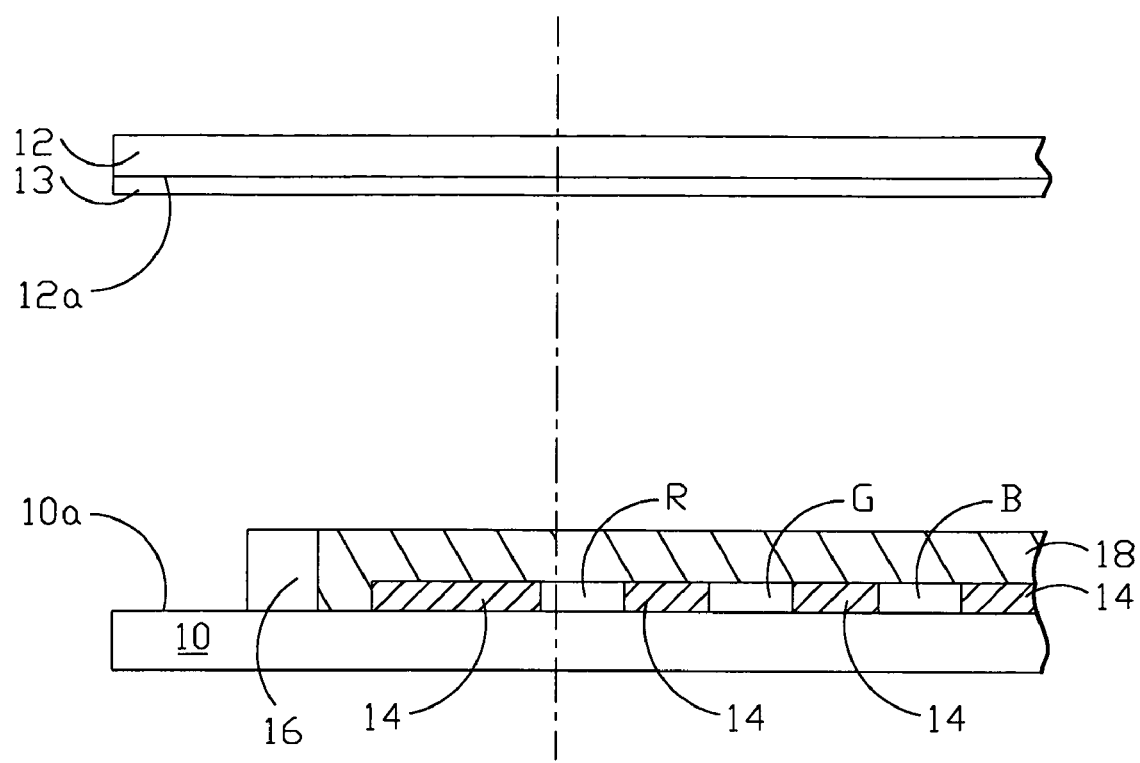

The third embodiment of the present invention is shown as FIG. 4A and FIG. 4B is a lateral view of FIG. 4A, wherein the insulating layer, PI film, spacer and polarizing film are not shown. There is a thin film transistor 13 on a first surface 12a of a bottom glass substrate 12. There are the color filters R, G and B, a black matrix 14 and a sealant 16 in the first surface 10a of the top glass substrate 10, wherein the preferred materials of the sealant 16 are acrylic resin or the synthetic material of acrylic resin and synthetic material. There is no black matrix 14 on the area with the sealant 16. The black matrix 14 is a material that can be used to shield the light and the preferred one can be chosen from the group consisting of chromium (Cr), chromium oxide (CrO) or any of the three elements of the opaque resin. The black matrix 14 is used to avoid the phenomenon of light leak during using the liquid crystal panel to enhance the quality of the contrast and the displaying. The color filters are formed on the first surface 10a of the top substrate 10, wherein the color filters are formed in the openings of the black matrix 14 respectively. The black matrix 14 can also be formed on the area on the first surface 12a of the bottom glass substrate 12 mapping vertically to the first surface 10a of the top glass substrate 10. If the black matrix 14 is an opaque material with electric conductivity, a dielectric can be deposited under it to prevent the conductive phenomenon caused by contacting the other wiring.

Drop a suitable amount of liquid crystal 18, being evaluated according the size of the panel and the thickness, on a peripheral region of the first surface 10a surrounded of the sealant 16. Assemble the first surface 12a of the bottom glass substrate 12 with the first surface 10a of the top glass substrate 10 face to face in a preferred circumstance (such as a vacuum). Then, a light is used to irradiate the sealant 16 through the upward surface of the top glass substrate 10 to cure the sealant 16 to complete the process.

The sealant 16 can be deposited on one of the two glass substrates. The embodiment is a preferred embodiment and not used to limit the way to deposit the sealant. The light used in the embodiment is adaptive depending on the sensitizer in the sealant 16.

In the conclusion, the present invention discloses the manufacturing method and structure for forming the liquid crystal panels with ODF. Comparing to the prior art, the problems of the incompletely curing, the increasing process complexity caused by the incident irradiating or the substrate reflecting and the increasing are exposed by the ultraviolet rays will be reduced. The present invention can make the complete curing of the sealant, the irradiating of the line to the sealant perpendicular to the glass substrates. Furthermore the curing process is easier and the restriction of the one drop fill (ODF) process is looser.

The embodiments are only used to illustrate the present invention, not intended to limit the scope thereof. Many modifications of the embodiments can be made without departing from the spirit of the present invention.

What is claimed is:

1. A method for manufacturing a liquid crystal panel, comprising:
   providing a first glass substrate;
   forming a thin film transistor on said first glass substrate;
   forming a black matrix on a first surface of said first glass substrate, wherein said black matrix includes a plurality of openings;
   forming a plurality of color filters on said first surface of said first glass substrate, wherein said color filters are formed in said openings of said black matrix respectively;
   forming a sealant on the peripheral region of a first surface of a second glass substrate;
   dropping an amount of liquid crystal on said first surface of said second glass substrate surrounded by said sealant;
   assembling said first glass substrate and said second glass substrate by said sealant, wherein said first surface of said first glass substrate faces said first surface of said second glass substrate; and
   curing said sealant by a light irradiation from a side of said second glass substrate.

2. The method of claim 1, wherein said light irradiation is ultraviolet ray.

3. The method of claim 1, wherein said light irradiation is visible light.

4. The method of claim 1, wherein the material of said sealant is acrylic resin.

5. The method of claim 1, wherein the material of said sealant is the synthetic material of acrylic resin and epoxy resin.

6. The method of claim 1, wherein the direction of said light irradiation is perpendicular to said first surface of said second glass substrate.

7. The method of claim 1, wherein the material of said black matrix is selected from the group consisting of chromium, chromium oxide and an opaque resin.

8. The method of claim 1, further comprising forming another sealant on the peripheral region of said first surface of said first glass substrate, wherein said sealant and said another sealant face each other.

* * * * *